United States Patent [19]

Kronberg

[11] Patent Number: 5,046,371

[45] Date of Patent: Sep. 10, 1991

[54] IN-LINE ROTATING CAPACITIVE TORQUE SENSOR

[76] Inventor: James W. Kronberg, P.O. Box 385, Beach Island, S.C. 29841

[21] Appl. No.: 461,962

[22] Filed: Jan. 8, 1990

[51] Int. Cl.$^5$ .............................................. G01L 3/10
[52] U.S. Cl. ................................................ 73/862.33
[58] Field of Search ......................... 73/862.33, 862.32

[56] References Cited

U.S. PATENT DOCUMENTS

| | | | |
|---|---|---|---|
| 2,217,539 | 10/1940 | De Bruin | 73/862.33 |
| 2,260,036 | 10/1941 | Kuehni | 73/862.33 |
| 2,409,876 | 10/1946 | Martin et al. | 73/862.33 |
| 2,476,410 | 7/1949 | Gardiner | 73/862.33 |
| 3,142,981 | 8/1964 | Gross | 73/862.33 |
| 3,487,402 | 12/1969 | Hillhouse | 73/862.33 |
| 3,729,991 | 5/1973 | Hardway, Jr. | 73/862.33 |
| 4,448,275 | 5/1984 | Kitagawa et al. | 73/862.33 |
| 4,502,340 | 3/1985 | Gebben | 73/862.33 |
| 4,621,701 | 11/1986 | Takabayashi et al. | 73/862.33 |
| 4,785,675 | 11/1988 | Takasu et al. | 73/862.33 |
| 4,796,463 | 1/1989 | Tsals et al. | 73/862.33 |

Primary Examiner—Charles A. Ruehl
Attorney, Agent, or Firm—Harold M. Dixon; Stephen D. Hamel; William R. Moser

[57] ABSTRACT

A method and apparatus for measuring torques developed along a rotating mechanical assembly comprising a rotating inner portion and a stationary outer portion. The rotating portion has an electrically-conductive flexing section fitted between two coaxial shafts in a configuration which varies radially in accordance with applied torque. The stationary portion comprises a plurality of conductive plates forming a surface concentric with and having a diameter slightly larger than the diameter of the rotating portion. The capacitance between the outer, nonrotating and inner, rotating portion varies with changes in the radial configuration of the rotating portion. Signal output varies approximately linearly with torque for small torques, nonlinearly for larger torques. The sensor is preferably surrounded by a conductive shell to minimize electrical interference from external sources.

19 Claims, 5 Drawing Sheets fig.1a.

IN-LINE ROTATING CAPACITIVE TORQUE SENSOR

BACKGROUND OF THE INVENTION

Field of the Invention and Contract Statement

The U.S. Government has rights in this invention pursuant to Contract No. DE-AC09-76SR00001 between the U.S. Department of Energy and E.I. DuPont de Nemours & Co.

The present invention relates to a method and apparatus for measuring torques developed along a rotating mechanical assembly.

DISCUSSION OF BACKGROUND

Torque in a rotating shaft or mechanical assembly must sometimes be measured to a high degree of accuracy. While techniques for accurate torque measurement in stationary assemblies are well-established, adaptations for measuring torque in rotating assemblies have usually been unsatisfactory.

Torque is often measured using load cells, devices containing an elastic material which flexes in response to an applied force. The majority of torque sensors are simply load cells constructed so that flexing takes place in response to torque, normally exerted between two end shafts or other connection points. Flexing alters the electrical resistance of one or more attached (or integral) resistive elements which carry an electric current, producing a small but measurable high-impedance electrical output proportional to the applied force.

Complications may arise when the sensor is part of a continuously rotating section of an assembly. Continuous rotation makes electrical connection between the rotating and stationary sections of the sensor difficult, since cables making a direct connection would quickly be twisted and broken. Alternative connection methods involving mechanical contact, such as the use of slip rings or commutators, introduce high electrical resistance and generate frictional noise at the points of contact that can obscure the very low-level signal. Preamplification of the load-cell output can reduce, but not eliminate, this problem.

Another form of mechanical coupling depends on differential gearing to reverse the direction of the rotating shaft while a stationary sensor measures the reactive torque on the gearbox. This method also introduces some degree of friction and mechanical noise because of the number of moving parts required. As a result, sensors of this type are generally not capable of accurate measurement at low torque ranges.

Some mechanical coupling problems can be alleviated with capacitive coupling. But some additional problems can occur. For example, a small or nonsymmetric stationary plate area will result in measurements which are highly dependent on the shaft rotation speed and orientation. The effects of stray capacitance and fringing effects near the edges of the capacitive elements of a capacitive torque sensor introduce an additional source of error into the measurements.

Furthermore, presently available sensors based on this principle are not fully capacitive: all require the use of metallic shafts and some connection between the rotating and stationary sections for grounding purposes. As noted above, this can add a source of mechanical and electrical noise which can obscure the signal being measured.

SUMMARY OF THE INVENTION

Accordingly, the present invention is a torque sensor positioned between two aligned shafts having a rotating inner portion and a concentric, stationary outer portion. The spacing between the rotating and stationary portions establishes a capacitance therebetween. The rotating portion has a means for varying its radial configuration from a nominal condition in response to torque applied to the shaft. As the radial configuration varies, so does the capacitance, which can be detected electrically and used as a measure of applied torque.

In one preferred embodiment, radial configuration varying means of the rotating portion includes an electrically-conductive cylindrical flexing section fitted between two coaxial shafts. The flexing section has a plurality of circumferential, equally spaced helical slots. Torque in one direction causes the slots to separate; torque in an opposing direction causes the slots to close. The radial configuration of the flexing section varies as torque is applied. In another embodiment, strips are attached to end fittings on each shaft. The strips separate and close in response to applied torque, depending on the direction.

The stationary outer portion of the sensor comprises a plurality of electrically-conductive plates, adjacent to each other and preferably helically wound to form a cylinder concentric with, wound counter to, and having a diameter slightly larger than the rotating inner portion.

In another embodiment, the rotating portion includes fingers rigidly attached to end fittings on the two shafts. The fingers interleave so that, as torque is applied, the fingers of one end fitting move relative to those of the other. One or more sheets is attached between a finger of one fitting and a finger of the other fitting so that, as the fingers move relative to each other, the sheets flex and the radial configuration of the rotating section varies.

The stationary portion is divided into horizontal plates to form a cylinder concentric with and slightly larger than the rotating portion with which it establishes a capacitance.

These capacitances, in turn, determine the working frequency of an oscillating circuit so designed that the sum of capacitor currents approaches zero, so little or no net current flows into or out of the flexing section during oscillation. This feature allows the flexing section to be electrically "floating", requiring no continuity between it and ground or other reference potential through the bearings or by any other path. The flexing section may be electrically isolated from the end shafts if desired. The stationary portion is surrounded by a conductive shell in continuous electrical contact with the stationary portion to prevent interference from external sources.

Signal output consists of a frequency which varies with torque in an approximately linear fashion for small torques and nonlinearly for larger ones, given the same sensor construction. The output signal may be transmitted as a frequency-type signal, with or without frequency conversion, or may be translated into some other signal type, such as analog voltage or current, using well-known techniques.

Reference is now made in detail to the present preferred embodiment of the invention, an example of which is given in the accompanying drawings.

A BRIEF DESCRIPTION OF THE DRAWINGS

The accompanying drawings, which are incorporated in and form a part of the specification, illustrate the invention and, together with the description, serve to explain the principles of the invention. In the drawings:

FIGS. 3a-b show two perspective views of an alternative embodiment of the rotating inner portion of the torque sensor, consisting of rigid fingers joined by a flexible conductive sheet. FIG. 3a shows the inner portion with the sheet removed; FIG. 3b shows the inner portion with the sheet in place.

FIGS. 6a-c show a series of cross-sectional views of the sensor along the line 6—6 of FIG. 5, with no torque applied (FIG. 6a), torque applied in one direction (FIG. 6b), and torque applied in the opposite direction (FIG. 6c).

DETAILED DESCRIPTION OF THE INVENTION

Figure 1A:
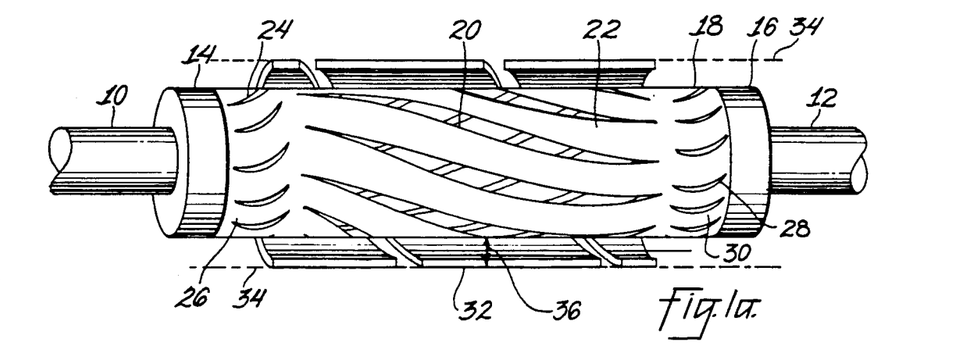
FIGS. 1a-c show a perspective views of an embodiment of the sensor with no torque applied (FIG. 1a), torque applied in one direction (FIG. 1b), and torque applied in a second direction (FIG. 1c).

FIG. 1a shows the sensor in its simplest form. Shafts 10 and 12, having a common rotational axis, are joined by fittings 14 and 16 to inner rotating portion 18 formed, preferably, from elastic material of high electrical conductivity, such as phosphor bronze. Shafts 10 and 12 and fittings 14 and 16 may be electrically conductive or nonconductive, as may be convenient.

A plurality of slots 20 are cut through the wall of rotating portion 18, spaced preferably equally around its circumference, separating rotating portion 18 into strips 22. Each strip 22 describes a section of a helix whose main axis parallels that of the section. Each slot 20 has its center approximately midway between fittings 14 and 16. Antihelical slots 24 separated by strips 26 are cut through the wall of rotating portion 18, each slot 24 extending from near fitting 14 to near the end of a slot 20. Antihelical slots 28, separated by strips 30, are similarly located near fitting 16. Slots 20, 24, and 28 may be of tapered width as shown, or of uniform width, as may be convenient.

Alternatively, rotating portion 18 may be formed from a plurality of different strips, bent into helical form and mechanically and electrically bonded together at the ends.

A plurality of conductive plates 32 are arranged to form a stationary portion 34 surrounding rotating portion 18 at spacing 36. The axis of surface 34 coincides with the rotational axis of rotating portion 18, so that portion 18 may rotate within the stationary array of plates 32. For simplicity, FIGS. 1a-c show only the rear halves of these plates.

Plates 32 may conveniently be formed by cutting or etching boundary slots through a layer of conductive material supported by a thin-walled insulating cylinder (not shown).

In the preferred embodiment, three plates 32 are used, each taking the form of a helical "barber-pole stripe" roughly perpendicular to helical slots 20 and separated by corresponding helical gaps. Alternatively, stationary portion 34 could be divided in a different fashion and possibly into a different number of separate plates, as convenient for fabrication and consistent with the electronic principles of the sensor as described below.

Figure 1B:
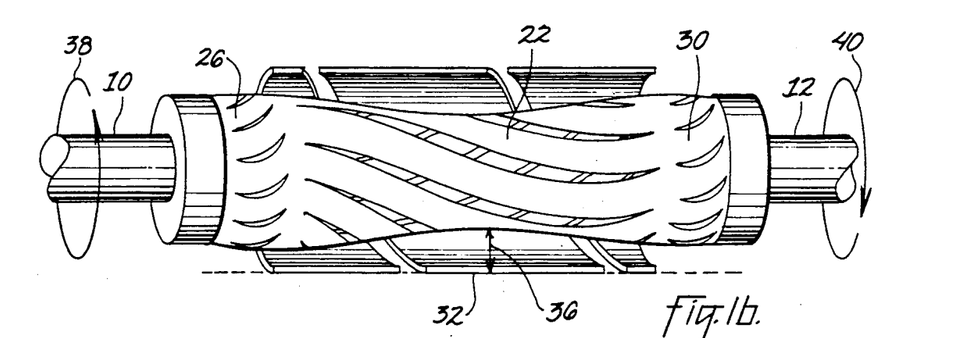
Figure 1C:
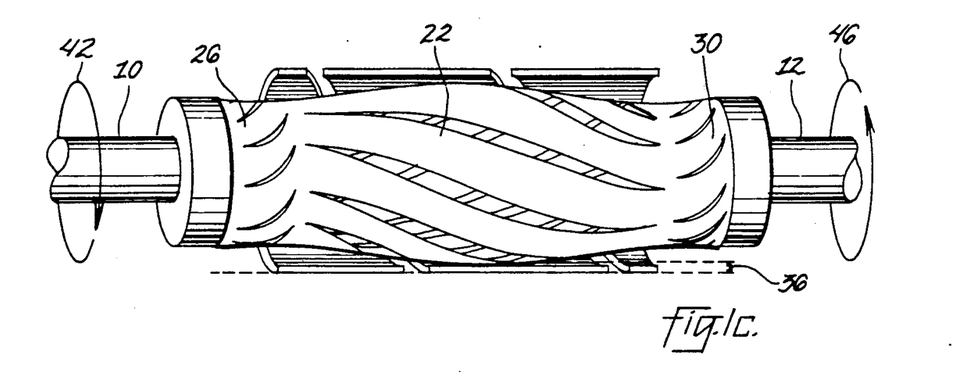

FIG. 1b shows opposing torques 38 and 40 applied to shafts 10 and 12 in a direction "with" helical slots 20, placing tension on strips 22, and compression on strips 26 and 30. In response, strips 22 draw inward, contracting rotating portion 18; strips 26 and 30 draw outwards, expanding rotating portion 18 while the overall length of rotating portion 18 remains essentially unchanged. Spacing 36 increases, decreasing the capacitances between rotating portion 18 and surrounding plates 32. Conversely, FIG. 1c shows opposing torques 42 and 46 applied "against" helical slots 20, placing strips 22 in compression, and strips 26 and 30 in tension. Strips 22 draw outwards, expanding rotating portion 18; strips 26 and 30 draw inwards, contracting rotating portion 18 while the overall length of portion 18 remains essentially unchanged. Spacing 36 thus decreases, increasing the capacitance between rotating portion 18 and surrounding plates 32. Hence, capacitance is a function of the torque applied between shaft 10 and shaft 12.

The usable torque range measured by a sensor of this type could be changed by varying any one or any combination of the following: the length of rotating portion 18; its diameter; its material; the thickness of its walls; the number of slots 20, 24, and 28; their length; their contour (uniform or varying width); and the pitch (or angle) at which they spiral around portion 18.

Figure 2A:
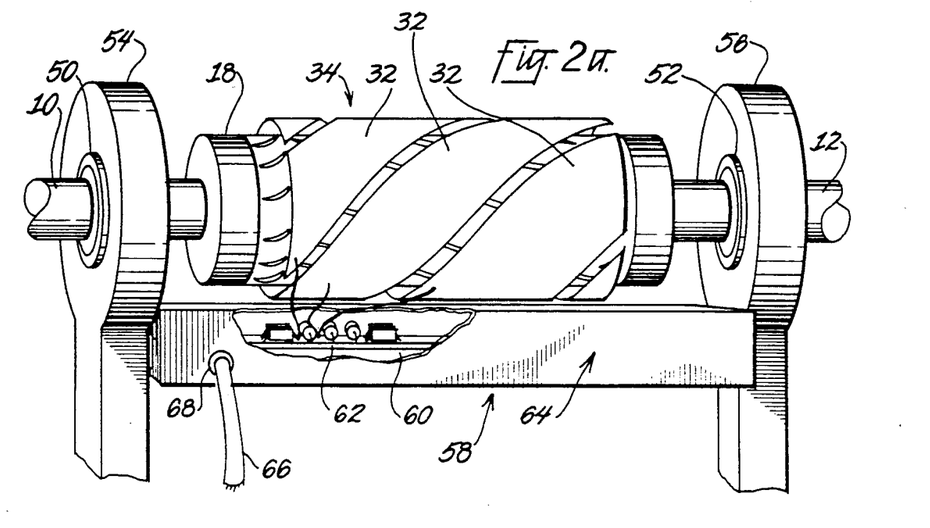
FIG. 2a shows a perspective view of an embodiment of the torque sensor with the base partially cut away to show the circuitry.
Figure 2B:
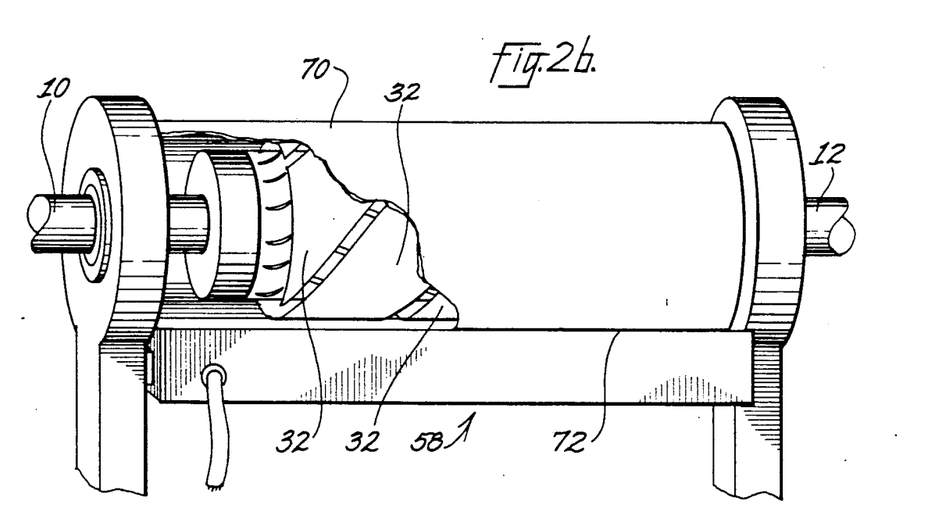
FIG. 2b shows a perspective view of the complete torque sensor with the shell partially cut away to show the rotating inner and nonrotating outer portions.

FIGS. 2a and 2b show a more complete embodiment of progressive stages in the assembly of the sensor.

FIG. 2a shows shafts 10 and 12 supported by bearings 50 and 52, which are mounted in shaft hangers 54 and 56. Axial shaft motion is restrained by shaft collars (not shown), so that only pure torque is transmitted to rotating portion 18. Stationary member 58 joins the shaft hangers 54 and 56 (or other bearing supports) and has an internal hollow 60 housing an electronic circuit assembly 62. Member 58 is made of electrically-conductive material, or has its upper surface, and either its exterior or the interior of hollow 60, covered with such material, forming a continuous conductive layer. The side walls 64 of hollow 60 may stop below the axis of rotating portion 18, as shown in FIG. 2a, or may rise above it. Cable 66 passes outward from circuit assembly 62 through hole or fitting 68 in member 58, or past its edge, providing for connection to external apparatus (not shown).

Stationary conducting plates 32 surrounding rotating portion 18, as described for FIG. 1a, are supported mechanically by member 58, but make electrical connection with circuit assembly 62 by means of connecting cables. In the preferred embodiment three plates 32 are used, each taking the form of a helical strip roughly perpendicular to helical slots 20. Alternatively, stationary portion 34 could be divided in a different fashion and possibly into a different number of separate plates, as convenient for fabrication and consistent with the electronic principles of the sensor.

FIG. 2b shows shell 70 surrounding plates 32, at a distance preferably several times greater than that between plates 32 and portion 18. Shell 70 is made of conductive material, or has its edges and either its exterior or interior surface covered with such material, forming a continuous conductive layer. It is so constructed that, when in place, it forms a continuous electrical contact with member 58 along surface 72—either through unbroken contact, through the use of conductive gasketing, or by overlap of the edges—so that no significant escape of radio-frequency energy is possible.

Figure 3A:
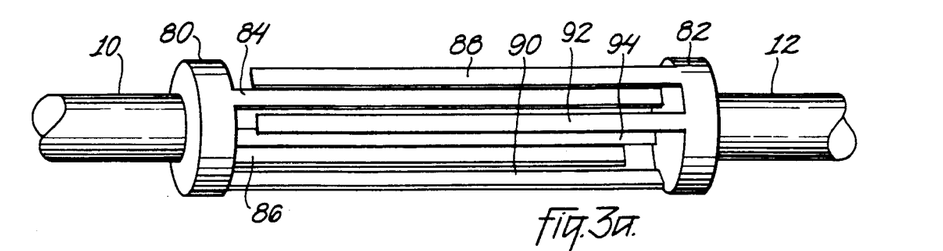
Figure 3B:
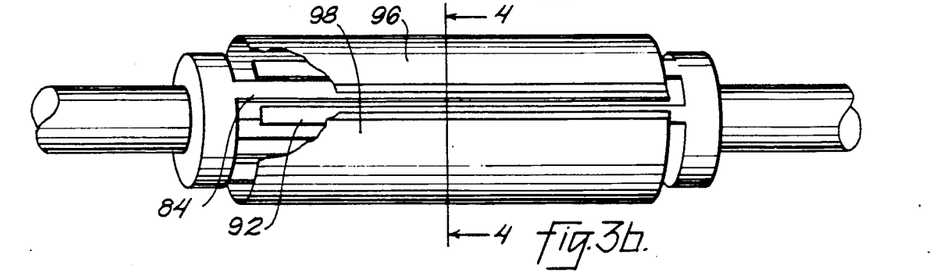

FIGS. 3a and 3b show an alternate embodiment of the rotating portion of the present capacitive torque sensor. Since all stationary components are the same as in FIGS. 2a and 2b, only the rotating portion of the sensor is shown.

FIG. 3a shows shafts 10 and 12, with the same axis of rotation, connected to fittings 80 and 82; these replace fittings 14 and 16 in FIGS. 1a–c. Fitting 80 bears two rigid, opposing fingers 84 and 86, running parallel to the axis of rotation of the shaft. Fitting 82 has two finger pairs 88 and 90, and 92 and 94, one finger of each pair separated from a finger of the other pair by a little more than the width of finger 84. These fingers are preferably of metal; fittings 80 and 82 and shafts 10 and 12 may be of any convenient material, conductive or not. In a preferred embodiment, the assembly consisting of each fitting and its attached fingers is machined from a single piece of brass or stainless steel, attached to the corresponding shaft by means of set screws.

In the assembled sensor, finger 84 fits between fingers 88 and 92, and finger 86 between fingers 90 and 94, so that the relative rotation of shafts 10 and 12 is constrained to the small angle through which the interleaved fingers of fitting 80 and fitting 82 can move before striking. All six fingers are preferably of trapezoidal cross-section with their sides aligned with the rotational axis, so that upon forceful contact they will undergo no bending toward or away from this axis.

Bonded to finger 84 and to nearly opposing finger 94 is a sheet 96 of flexible, electrically-conductive material, preferably phosphor bronze, forming a surface curving slightly outwardly beyond the outer finger radius and thus slightly clearing finger 88. A like sheet 98 is bonded to finger 86 and to finger 92 in the same manner, and electrical contact is made between the two sheets through fingers 84 and 86 or 92 and 94, or through both pairs at once, either by forming one or both fittings 80 and 82 of metal or by attaching an external conductive path between fingers. Sheets 96 and 98 have a radius of curvature slightly less than that of the surrounding stationary plates 32.

Figure 4A:
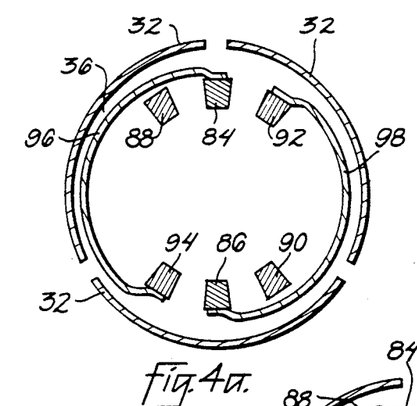
FIGS. 4a-c show a series of cross-sectional views of the sensor along the line 4—4 of FIG. 3b, with no torque applied (FIG. 4a), torque applied in one direction (FIG. 4b), and torque applied in an opposing direction (FIG. 4c) according to the alternative embodiment shown in FIGS. 3a and 3b.
Figure 4B:
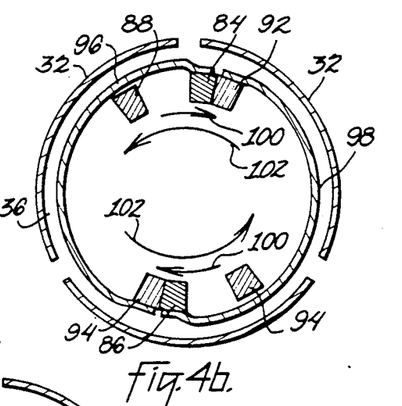
Figure 4C:
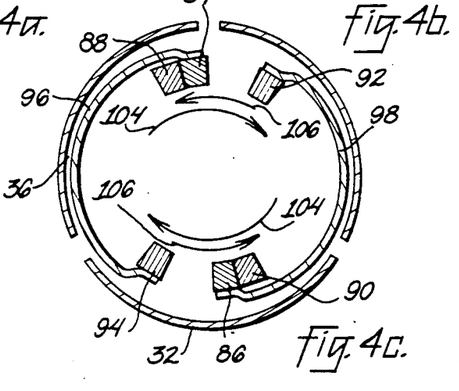

The effect of applied torque is shown in FIGS. 4a–c, showing the rotating assembly in cross-section along line 4—4 of FIG. 3b, surrounded by stationary plates 32.

FIG. 4a shows the assembly when no torque is applied. Fingers 84 and 86 are located roughly midway between fingers 88 and 92, and 90 and 94, respectively. Sheets 96 and 98 are thus in a "rest" position. Spacing 36 between their outermost points and plates 32 has a nominal "rest" width, and the capacitance between sheets 96 and 98 and plates 32 has a corresponding "rest" value.

FIG. 4b shows the effect of opposing torques 100 and 102, oriented so as to bring fingers 84 and 86 closer, respectively, to fingers 92 and 94. This motion places sheets 96 and 98 in tension, flexing them inward so that spacing 36 increases and the respective capacitances fall below their "rest" values. A sufficiently large opposing torque causes fingers 84 and 86 to strike against fingers 92 and 94; beyond this point no further flexing takes place in sheets 96 and 98, so that the sensor is not easily damaged through over-flexing even by severe overloads.

FIG. 4c shows the effect of torques 104 and 106 applied in the opposite direction. Fingers 84 and 86 move away from fingers 92 and 94, placing sheets 96 and 98 in compression, forcing them outward. Spacing 36 decreases, causing the respective capacitances to rise above their "rest" values. A sufficiently large torque causes fingers 84 and 86 to strike against fingers 88 and 90. Beyond this point no further flexing takes place in sheets 96 and 98, to prevent damage under severe overloads not only by avoiding over-flexing, but, by limiting the outward travel, assuring that sheets 96 and 98 do not come into contact with stationary plates 32.

The usable torque range measured by a sensor of this type could be changed by varying any one or any combination of the following: the thickness of elastic sheets 96 and 98; the distance between the rotational axis and their points of attachment to the fingers; their length, as measured parallel to the fingers; and the spacing between the fingers. Sheet length, width, contour, or thickness, or any combination of these, might vary with distance between finger attachments; sheets might also be perforated to concentrate flexing in some areas and reduce it in others. For very heavy torque loads, the numbers of fingers and elastic sheets could also be increased beyond those here given.

Figure 5:
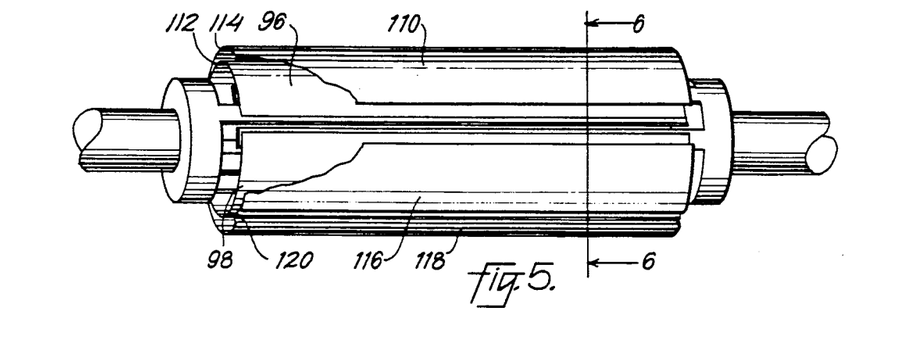
FIG. 5 shows a perspective view of the sensor with nonrotating portion and external surface according to an alternative embodiment of the present invention.

Additional conductive elements could be attached to sheets 96 and 98 to improve sensitivity. One possible arrangement is shown in FIG. 5. Here, sheets 96 and 98 have additional conductive surfaces attached along a line midway between the finger attachments. Sheet 96 bears an attached surface consisting of sections 110 and 112, joined to sheet 96 along linear seam 114. Similarly, sheet 98 bears an attached surface consisting of sections 116 and 118, joined to sheet 98 along seam 120. Sections 110, 112, 116, and 118 are of light, rigid conductive material, extending outward in both directions from the line of attachment, and with a radius of curvature very slightly less than that of stationary plates 32. They do not undergo significant flexing, thus may or may not be made of the same material as sheets 96 and 98, as may be convenient.

Figure 6A:
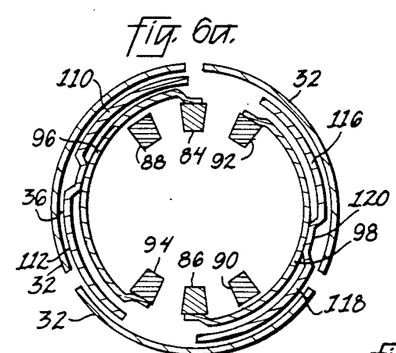

FIG. 6a shows the sensor in cross-section along line 6—6 of FIG. 5 with no torque applied. As shown in FIG. 4a, sheets 96 and 98 are in "rest" position, with fingers 84 and 86 located roughly midway between fingers 88 and 92, and 90 and 94, respectively. Spacing 36 between their outermost points and plates 32 has a nominal "rest" width, and the capacitance between surfaces 90–92 and 96–98 and plates 32 has a corresponding "rest" value.

Figure 6B:
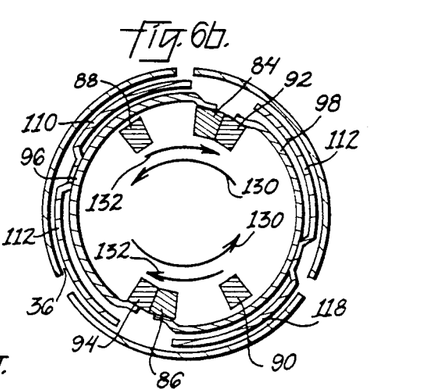

FIG. 6b shows the effect of opposing torques 130 and 132, oriented so as to bring fingers 84 and 86 closer respectively to fingers 92 and 94. This places sheets 96 and 98 in tension, flexing them inward, with the maximum displacement occurring at the center of each sheet. Here, however, surfaces 110-112 and 116-118 move inward as well; since each is anchored along the center of the corresponding sheet 96 or 98, the maximum motion now takes place over essentially the full outside area of the composite surface defined by 110-112 and 116-118. The proportional variation in capacitance across spacing 36 is therefore much greater than with the sensor illustrated in FIGS. 3 and 4a–c.

FIG. 6c shows the effect of torques 134 and 136 applied in the opposite directions to 130 and 132. Motion of fingers 84 and 86 away from fingers 92 and 94 places sheets 96 and 98 in compression, forcing them, and surfaces 110-112 and 116-118, outward. Because surfaces 110-112 and 116-118 do not flex significantly, they can be given very nearly the same radius of curvature as plates 32, and can be made to approach them very closely before fingers 84-88 and 86-90 come into contact and stop the flexing: again, producing a variation in capacitance which is much greater than that obtainable with the sensor illustrated in FIGS. 3 and 4a–c.

Figure 7:
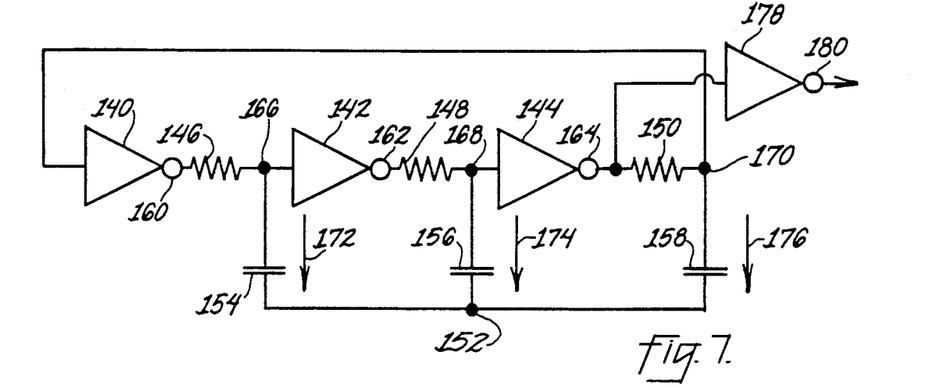
FIG. 7 shows an embodiment of an oscillator circuit according to the present invention.

FIG. 7 shows a simple electronic circuit which may be used to read the varying capacitances between section 18 and plates 32 and convert them to a variable-frequency, square-wave output without requiring any electrical connection (other than capacitive) between the stationary and rotating portions of the sensor. While it will be obvious that similar results could be obtained with a wide variety of alternative circuits, discussion here will be restricted to the circuit shown.

All components shown, plus any desired conversion circuitry to provide analog voltage, analog current or lower-frequency outputs, are mounted on circuit board 50 and enclosed by the radio-frequency shielding of supporting member 58 and shell 70.

The circuit consists of three inverters 140, 142 and 144, preferably made using 4000-series or other balanced CMOS technology; in the preferred embodiment, these are three of the six inverters in a 4049-type package. These are interconnected head-to-tail by three resistors 146, 148 and 150 of approximately equal value, and shunted to a common node 152 by three capacitors 154, 156 and 158 which represent, respectively, the roughly equal capacitances between the three stationary plates 32 and the rotating portion of the sensor.

Together, these nine components form a ring oscillator whose operating frequency is set by the R-C time constants of resistor-capacitor pairs 146-154, 148-156, and 150-158. The capacitance is determined by spacing 36 between the rotating portion and plates 32, which is a function of the applied torque. The output frequency therefore closely reflects this torque, with little or no backlash, hysteresis or interference from other physical or electrical variables. The relationship, however, is likely to be nonlinear except over limited ranges. Hence, some applications may require the addition of small "padder" capacitors, resistor-capacitor networks or other components in parallel with the plate capacitances to help linearize the system response.

Figure 8A:
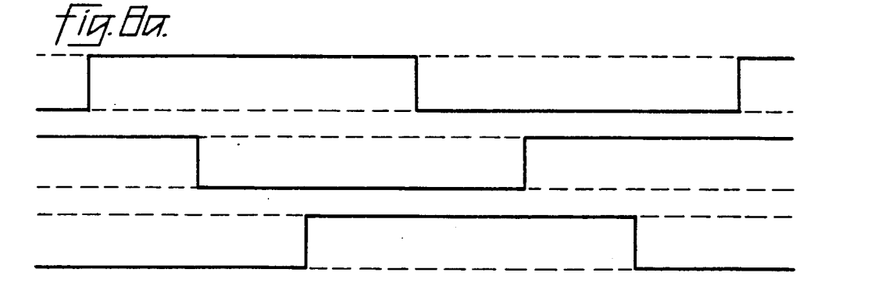
FIGS. 8a-c show representative voltage waveforms at the inverter outputs (FIG. 8a) and inverter inputs (FIG. 8b), and displacement current waveforms (FIG. 8c) according to the present invention.
Figure 8B:
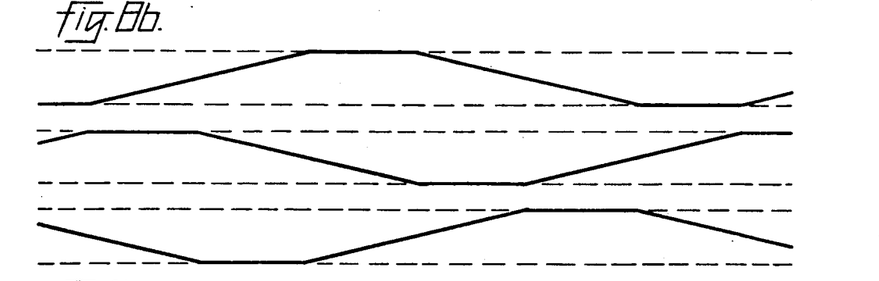
Figure 8C:
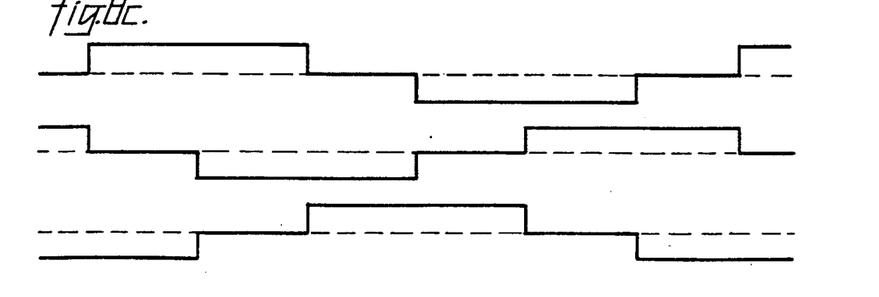

Representative waveforms are shown in FIGS. 8a–8c. Voltages are shown at inverter outputs 160, 162, and 164 (FIG. 8a), and at inverter inputs 166, 168, and 170 (FIG. 8b). Displacement-current waveforms 172, 174, and 176 across the plate capacitances are also shown (FIG. 8c). Because the ring is symmetrical, all waveforms of each group are similar, differing only by 120-degree phase shifts. Output waveforms are square; input waveforms are roughly trapezoidal, with slopes determined by resistor-capacitor interaction. Displacement-current waveforms show alternate positive and negative pulses. It should be noted that, since the sum of all displacement currents is zero, there is no requirement for node 152 to be grounded or indeed connected in any way to the remainder of the circuit, except through the capacitances shown.

The square wave present at the output of inverter 144 is fed not only to resistor 150 but also to the input of a fourth gate 178, which buffers the signal so that external loads will have no effect on the operating frequency of the ring oscillator, providing output signal 180. Gate 178 may or may not be inverting, as convenient, and may consist of multiple units connected in parallel to decrease output impedance and improve current-handling capability. In the preferred embodiment, three of the inverters in the 4049 package are used in the ring oscillator and the other three are tied in parallel to drive the output. Alternatively, binary dividers or other conversion devices could be added to circuit board 62 to convert the output of gate 178 to virtually any desired analog or digital signal type.

The foregoing description of preferred embodiments of the invention has been presented for purposes of illustration and description. It is not intended to be exhaustive or to limit the invention to the precise form disclosed, and obviously many modifications and variations are possible in light of the above teachings. The embodiments were chosen and described in order to best explain the principles of the invention and its practical application to thereby enable one skilled in the art to best utilize the invention in various embodiments and with various modifications as are suited to the particular use contemplated. It is intended that the scope of the invention be defined by the claims appended hereto.

What is claimed is:

1. A torque sensor for use with a first shaft and a second shaft, said first shaft and said second shaft in axial alignment, said sensor comprising:
   a rotating portion positioned between and attached to said first and said second shafts, said rotating portion having
   a nominal radial configuration when no torque is applied to said shafts, and
   a means for varying said radial configuration responsive to torque applied to said shafts;
   a stationary portion in spaced relation and concentric to said rotating portion, said stationary portion and said rotating portion having confronting electrically conductive surfaces which establish a capacitance therebetween, said capacitance varying with changes in the radial configuration of said rotating portion;
   a conductive shell surrounding said stationary portion; and
   circuit means in electrical connection with said stationary portion and responsive to changes in said capacitance for generating an output signal having a value in accordance with said capacitance.

2. The torque sensor of claim 1, wherein said rotating portion further comprises:
   a hollow tubular section of elastic material of high electrical conductivity with a plurality of approximately equally spaced slots cut helically through the circumference of said section, said slots separating as torque is applied in one direction and closing as torque is applied in an opposing direction.

3. The torque sensor of claim 2, wherein said stationary portion further comprises a plurality of plates.

4. The torque sensor of claim 3, wherein said plates form helical strips having axes parallel to the axis of said rotating portion, said helical strips running counter to and being approximately perpendicular to said helical slots of said rotating portion.

5. The torque sensor of claim 4, wherein said plates are formed by cutting or etching boundary slots through a layer of conductive material supported by a thin-walled insulating surface.

6. The torque sensor of claim 3, wherein said plates are formed by cutting or etching boundary slots through a layer of conductive material supported by a thin-walled insulating surface.

7. The sensor of claim 2 wherein said circuit means further comprises a means for reading the capacitance between said rotating portion and said stationary portion and for converting said capacitance to a variable frequency, square wave output.

8. The torque sensor of claim 1, wherein said rotating portion further comprises
a first fitting;
a second fitting; and
said varying means has a plurality of helical strips, each strip having a first end and a second end, said first ends attached to said first fitting and said second fitting attached to said second end,
said strips separating as torque is applied in one direction and closing as torque is applied in an opposing direction.

9. The sensor of claim 8 wherein said circuit means further comprises a means for reading the capacitance between said rotating portion and said stationary portion and for converting said capacitance to a variable frequency, square wave output.

10. The torque sensor of claim 1, wherein said rotating portion further comprises:
a first assembly having a first fitting connected to said first shaft, said first fitting having a plurality of first fingers parallel to the axis of rotation of said first shaft; and
a second assembly having a second fitting connected to said second shaft, said second fitting having a plurality of second fingers parallel to the axis of rotation of said second shaft,
said second fingers interleaved with said first fingers; and
at least one sheet attached to a first finger and to a second finger so that, as said first shaft turns with respect to said second shaft and said first fingers move with respect to said second fingers, said sheets attached therebetween flex, thereby changing said spaced relation between said rotating portion and said stationary portion.

11. The torque sensor of claim 10, wherein said first and said second assemblies are machined as a single unit.

12. The torque sensor of claim 10, wherein said first and said second fingers have trapezoidal cross sections.

13. The torque sensor of claim 10, wherein said first and said second shafts and said first and said second fittings are made of nonconductive material.

14. The torque sensor of claim 10, wherein said sheets are perforated to selectively increase flexing.

15. The sensor of claim 10 wherein said circuit means further comprises a means for reading the capacitance between said rotating portion and said stationary portion and for converting said capacitance to a variable frequency, square wave output.

16. The torque sensor of claim 1, wherein said stationary portion further comprises a plurality of plates.

17. The torque sensor of claim 16, wherein said plates are formed by cutting or etching boundary slots through a layer of conductive material supported by a thin-walled insulating surface.

18. The sensor of claim 16 wherein said circuit means further comprises a means for reading the capacitance between said rotating portion and said stationary portion and for converting said capacitance to a variable frequency, square wave output.

19. The sensor of claim 1 wherein said circuit means further comprises a means for reading the capacitance between said rotating portion and said stationary portion and for converting said capacitance to a variable frequency, square wave output.

* * * * *